Patented Sept. 17, 1929

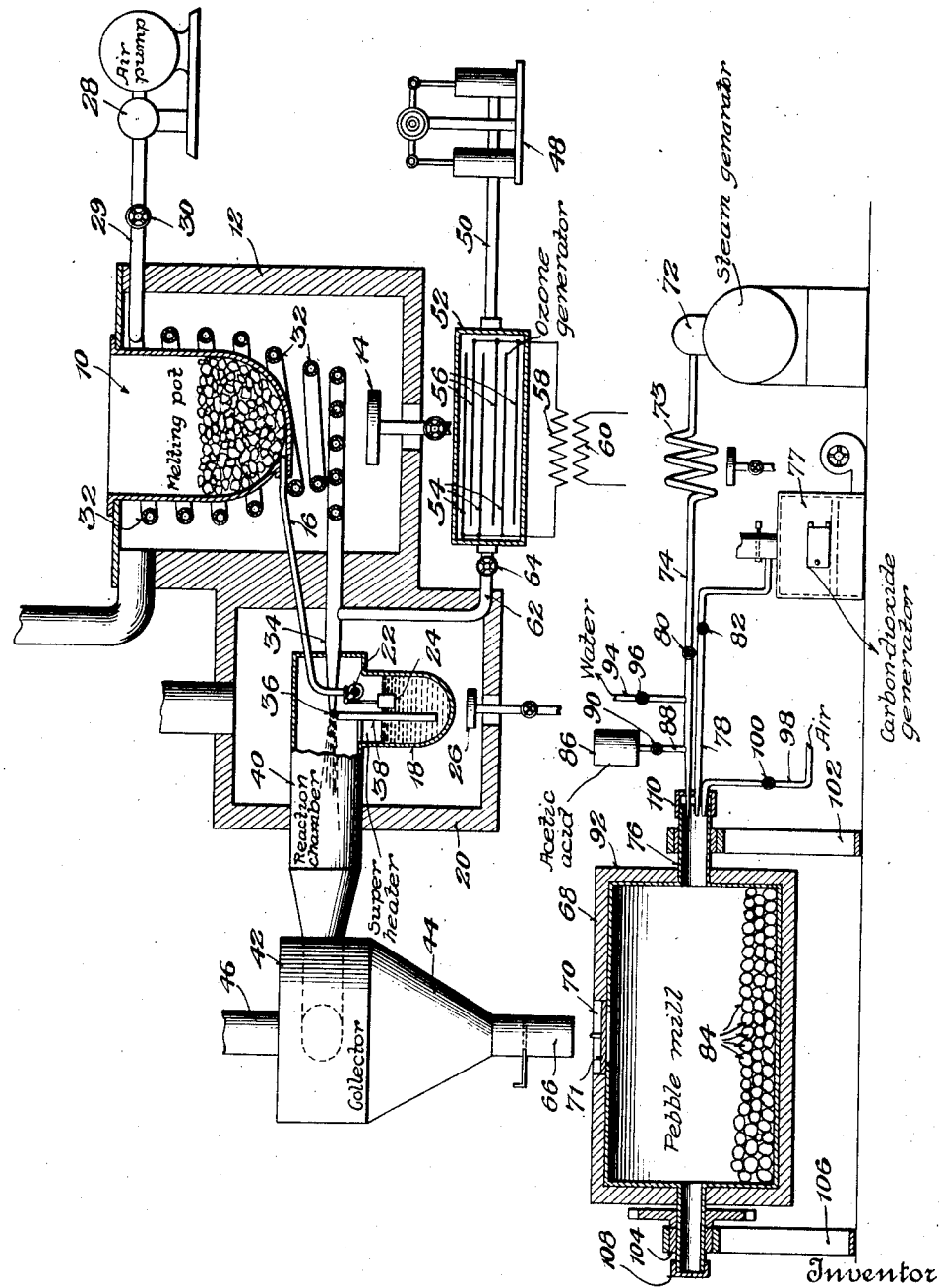

1,728,388

UNITED STATES PATENT OFFICE

CHESTER H. BRASELTON, OF TOLEDO, OHIO

PROCESS OF MAKING LEAD COMPOUNDS

Application filed June 29, 1920. Serial No. 392,624.

This invention relates to a process and apparatus for making lead compounds, and more particularly to a process and apparatus for quickly and cheaply making oxides of lead and white lead of excellent quality.

In the processes heretofore used for making lead oxides such as litharge and red lead, the lead to be oxidized has been subjected to the action of oxidizing gases under conditions in which the temperature and character of the lead and oxidizing gases could not be regulated to control the degree and uniformity of oxidation, or could be controlled only with the greatest difficulty and the exercise of great skill. The apparatus heretofore employed has also been of such a character that the oxidation of the lead required a comparatively long period of time and the use of excessive quantities of heat and of a large amount of labor.

The primary object of the present invention is to provide a process for rapidly and cheaply oxidizing metallic lead to lead oxide.

Another object of the invention is to provide a process of oxidizing lead in which the manner and degree of oxidation may be easily and accurately controlled.

A further object of the invention is to provide an apparatus by means of which lead may be oxidized with a minimum consumption of heat and labor, and to provide means for controlling the oxidation of the lead.

A further object of the invention is to provide a process and apparatus in which lead oxide may be rapidly transformed to white lead of excellent quality.

With these and other objects in view, the invention consists of the process and apparatus described in the following specification and defined in the claims.

The various features of the invention are illustrated in the accompanying drawing, which shows the preferred form of an apparatus suitable for carrying out the process.

In oxidizing the lead to lead oxide in the present invention, the lead is first melted and preferably heated to a temperature somewhat above its melting point. It is then sprayed or atomized into a current of incandescent or very highly heated gases which may be made somewhat more reactive by the addition of small quantities of ozone. The minute particles of atomized molten lead are rapidly oxidized by contact with the incandescent highly reactive oxygen and form a suspension of fine powder or small granules of lead oxide which may be readily separated from the gases. By adjusting the temperature of the oxidizing air, the proportions of air and lead and other factors entering into the oxidation, the degree and manner of oxidation of the lead may be controlled to produce various commercial grades of litharge and red lead.

The litharge or lead oxide produced in this manner may be further converted to white lead. When the lead oxide is used for this purpose it is transferred to a pebble or ball mill partly filled with balls or pebbles of quartz, or some other substance which will not injure the white lead produced and which is sufficiently hard to remove the coating of white lead produced on the particles of lead oxide. Superheated steam and carbon dioxide are admitted to the pebble mill, and in case the lead needs further oxidation a quantity of air or other gas containing oxygen may also be admitted. The mixture of carbon dioxide and steam rapidly corrodes the surface of the lead particles and forms a dense amorphous coating of white lead, which opposes the access of additional corroding gases to the particles of lead oxide and hinders the further corrosion of the lead. The pebble mill is, therefore, constantly rotated during the reaction and the tumbling and falling of the balls or pebbles continuously removes the coating of white lead and exposes a fresh surface to the corroding gases.

Referring more specifically to the accompanying drawings, the lead to be treated is melted in a melting kettle 10, which is heated in a suitable furnace 12 by means of a fluid fuel burner 14, or other heating means. The molten lead flows from the lower part of the kettle 10 through a conduit 16 to a superheating vessel 18 situated within a furnace 20. The flow of lead through the conduit 16 is controlled by a valve 22 at the lower end of the conduit 16, the position of which is governed by a float 24 to maintain a constant level in the superheating vessel 18 to heat the molten lead materially above its melting point. The lead in the heating vessel 18 is heated to a temperature above the melting point of the lead by means of a fluid fuel burner 26 or other heating means which can be controlled to regulate the temperature in the super-heating vessel. From the super-heating vessel 18 a small stream of molten lead is constantly removed and atomized in the reaction chamber or passageway 40 into a current of highly heated and very reactive oxygen or gas containing oxygen and is thereby rapidly oxidized.

The air for oxidizing the lead is supplied by means of an air compressor 28, through a supply pipe 29 and control valve 30 to a heating coil 32 in the furnace 12. The coil 32 is constructed of material capable of withstanding a very high temperature and is so positioned in relation to the burner 14 that the air passing through it is raised to a very high temperature or to a red heat. From the coil the highly heated air passes through a connecting pipe 34 to an atomizing nozzle 36 positioned in the reaction chamber or passageway 40 a short distance above the superheating vessel 18. The suction of the gas in passing through the nozzle 36 draws a small stream of lead from the superheating vessel 18 upwardly through a pipe 38 into the heated gas. The lead is atomized by the air jet and dispersed throughout the hot air as it leaves the nozzle, and the mixture of air and atomized lead passes from the nozzle through a heated passageway or reaction chamber 40, extending through the furnace 20. The atomized particles of hot lead are very rapidly oxidized to lead oxide by their intimate contact with the very hot, reactive oxygen in the passageway or reaction chamber 40 which is maintained at a high temperature by the furnace 20. From the passageway or reaction chamber 40 the gas and suspended lead oxide pass to a dust collector 42 of the cyclone or other suitable type. In the collector 42 the particles of litharge or lead oxide are separated from the gases and drop into a collecting hopper 44 at the bottom of the collector while the gases escape through an outlet 46 in the upper part of the collecting apparatus.

To obtain a satisfactory oxidation of the lead the oxidizing gases must be raised to a very high temperature, at which temperature they may be in a partly dissociated and very reactive state. The temperature required for the oxidation may, however, be lowered by admitting ozone to the superheated air just before it enters the atomizing nozzle 36. To this end a stream of air is supplied by means of an air pump 48 through a connecting pipe 50 to an ozonizing apparatus 52. The ozonizing apparatus may be of any suitable type, within which alternate electrode plates 54 and 56 are connected alternately to opposite poles of a high potential coil 58 of a transformer through the low potential coils 60 of which an alternating current is passed. From the ozonizing apparatus 52 the ozone passes through a connecting pipe 62 and control valve 64 to the air pipe 34 and the nozzle 36.

By the use of the ozonizing apparatus the temperature required for the oxidation of the lead to litharge is greatly reduced and it is possible to oxidize the lead directly to red lead. The degree of oxidation of the lead under these conditions may be controlled by controlling the extent to which the air has been activated or the temperature to which the air and lead are heated, the purity of the lead, and by varying the relative proportions of lead and air. For this latter regulation, the relative sizes of the nozzle 36 and pipe 38 may be adjusted to vary the proportion of air to lead, or the height of the surface of lead in the heating vessel 18 may be raised or lowered by adjusting the length of the valve stem connecting the valve 22 and the float 24, or the velocity of the heated air may be adjusted by means of the valves 30 and 64. The temperature to which the air is heated in the coil 32 may also be controlled by adjusting the burner 14 or the rate of supply of air to the coil 32.

The lead oxides prepared in the above process may be employed directly in the arts or may be further transformed directly into white lead. When the oxide is to be used for the production of white lead a measured quantity of the oxide is withdrawn through a chute 66 from the bottom of the hopper 44 and introduced into a pebble mill or tumbling drum 68 through an opening 70. The opening 70 is thereupon closed by means of a door 71 and the pebble mill placed in rotation. Steam for corroding the lead oxide is generated in a steam generator or boiler 72, superheated in a superheater 73 to a suitable temperature, and introduced into the pebble mill through a pipe 74 which projects into a hollow gudgeon or trunnion 76 forming a support for one end of the tumbling drum 68. A supply of heated carbon dioxide from a furnace 77 or other source of supply is also introduced into the pebble mill through a supply pipe 78. The supply of steam and carbon dioxide is controlled by means of valves 80 and 82 in the supply pipes 74 and 78 respectively to maintain the proper proportions of the two gases for obtaining the desired quality of white lead.

The mixture of steam and carbon dioxide rapidly corrodes the outer surface of the particles of lead oxide and converts it to a thin coating of dense compact white lead. The pebble mill is continuously rotated during the process and the surface coating of white lead is ground or rubbed off from the particles of lead oxide by the rolling and tumbling of a number of pebbles or balls 84 in the lower part of the ball mill. By means of this grinding and tumbling action a new surface is constantly being presented to the corroding action of the gases and the lead is rapidly and uniformly corroded.

The rapidity of corrosion may be sometimes increased by the presence of a trace of acetic acid vapor. Acetic acid may for the purpose be admitted from a supply tank 86 through a supply pipe 88 and regulating valve 90 to the superheated steam pipe 74 and vaporized before entering the tumbling drum or pebble mill 68.

In making some grades or qualities of white lead it is not desirable to dissolve the lead in a solution, as acid for example and precipitate it from this solution or to have conditions which promote the formation of a crystalline structure in the product. In this case the formation of an excessive amount of water and moisture in the pebble mill through the condensation of steam is lessened by covering the mill with a layer of asbestos or other heat insulating material 92, and the temperature of the pebble mill is controlled by the admission of superheated steam and gases and of water to maintain the proper temperature and humidity conditions. If the temperature should rise too high a small amount of water may be introduced through a supply pipe 94 and controlling valve 96 into the superheated steam pipe 74.

If the lead oxide to be corroded contains metallic lead, the oxygen required for completing the oxidation of the lead is supplied from an air supply pipe 98, the quantity of air supplied being controlled by a control valve 100.

The pebble mill is supported at one end by means of the trunnion 76 and a support 102, and at the other end by means of a similar trunnion 104 and standard 106. When air or carbon dioxide containing nitrogen is supplied to the mill, the end of the trunnion 104 may be left open for the outward passage of residual nitrogen. If pure carbon dioxide and no air are supplied, the trunnion 104 may be closed by a cap 108 to prevent the escape of the corroding gases, and the trunnion 76 may be similarly closed by means of a stationary cap 110 through which the pipes 98, 78 and 74 pass.

When the corrosion of lead is completed, the pebble mill is brought to rest with the opening 70 in the lowermost position and the white lead may be washed out of the mill 84 through the door 70. A continuous acting pebble mill of any suitable type may, of course, be substituted for the batch type described in the above specification.

Having described my invention, what I claim is—

1. Process of making oxides of lead which comprises comminuting said lead at a high temperature and bringing said comminuted lead into contact with heated oxygen, a portion of which has been chemically unstabilized in the form of ozone.

2. A process of making lead oxides, which comprises spraying melted lead into a stream of highly heated gases containing oxygen and ozone.

3. A process of making lead oxides which comprises melting lead, atomizing the molten lead and dispersing the atomized lead into gases containing oxygen and a small quantity of ozone.

4. A process of making lead oxides which comprises melting lead, heating the molten lead above its melting temperature, atomizing the melted lead, bringing the atomized lead into contact with oxygen at an incandescent temperature and in a highly reactive state and controlling the proportions of the lead and oxygen to control the degree of oxidation of said lead.

5. A process of making lead oxides, which comprises spraying melted lead into a stream of heated ozone.

6. A process of making lead oxides, which comprises heating melted lead to a temperature above its melting point and spraying said heated melted lead into a heated gas containing ozone.

7. A process of making lead oxides, which comprises melting lead, heating said molten lead to a definite controlled temperature, and introducing said heated molten lead in a finely divided condition into heated gases containing ozone.

8. A process of making lead oxides, which comprises bringing finely divided heated lead into intimate contact with gases containing oxygen and ozone, and adjusting the proportions of oxygen and ozone to obtain the desired degree of oxidation of said lead.

9. A process of making lead oxides, which comprises bringing finely divided heated lead into contact with gases containing oxygen and ozone and adjusting the temperature of said gases and the proportions of oxygen and ozone to control the oxidation of said lead.

10. A process of making lead oxides, which comprises heating air to a high temperature, introducing gases containing ozone into said heated air, and immediately contacting said air with finely divided molten lead.

11. A process of making lead oxides which comprises melting lead, bringing the molten lead in finely divided form into contact with hot gases containing unstabilized oxygen and controlling the proportions of lead and gases to control the degree of oxidation of said lead.

12. A process of making lead oxides which comprises treating metallic lead with oxygen containing gases at a red heat.

13. The process of making oxides of lead which comprises comminuting said lead and passing the same through a current of heated electrically activated oxidizing gases.

14. An apparatus for making lead compounds which comprises a means for melting lead, a reaction chamber connected to said lead melting means, means for maintaining a constant level of lead in said reaction chamber, means for heating an ozone-containing gas to incandescence, and means for passing a current of said gas into atomizing relation with melted lead in said reaction chamber so as to draw said lead into said current of gas.

15. An apparatus for making lead oxide which comprises a melting pot for melting lead, a reaction chamber connected to said melting pot, means for maintaining a constant level of molten lead in said reaction chamber, means for atomizing the lead in said reaction chamber by means of a current of ozone-containing gas, means for drawing off molten laid for atomizing from within the body of said molten lead in said reaction chamber, and means for varying the level of lead in said reaction chamber to maintain a constant level at any desired height within said reaction chamber.

16. An apparatus for making lead oxides which comprises a melting kettle, a reaction chamber, a conduit from said melting kettle to said reaction chamber, means for maintaining a constant level of molten lead in said reaction chamber, an air compressor, an atomizing nozzle within said reaction chamber above the level of molten lead therein, a pipe leading from said air compressor to said atomizing nozzle, means for heating said pipe and a suction pipe communicating with said nozzle for drawing molten lead from within the body of said melted lead so as to prevent access of impurities to the molten lead being atomized.

17. The process of forming lead compounds which consists in sub-dividing the lead into minute particles and subjecting the said particles to the action of a highly heated ozone-containing gas.

In testimony whereof, I affix my signature.

CHESTER H. BRASELTON.